United States Patent
Hollen et al.

(10) Patent No.: US 11,643,208 B2
(45) Date of Patent: May 9, 2023

(54) ADJUSTABLE COUPLING MECHANISMS FOR PROJECTILE DEVICES

(71) Applicant: THE BOEING COMPANY, Chicago, IL (US)

(72) Inventors: Keith R. Hollen, Saint Charles, MO (US); Sean C. Sundberg, Boulder, CO (US); Tim W. Hossfeld, Saint Charles, MO (US); Nathan M. Knibb, Ballwin, MO (US); Hans Luke Heindl, St. Louis, MO (US)

(73) Assignee: THE BOEING COMPANY, Arlington, VA (US)

( * ) Notice: Subject to any disclaimer, the term of this patent is extended or adjusted under 35 U.S.C. 154(b) by 613 days.

(21) Appl. No.: 16/789,856

(22) Filed: Feb. 13, 2020

(65) Prior Publication Data
US 2021/0276713 A1    Sep. 9, 2021

(51) Int. Cl.
*B64D 7/00*    (2006.01)

(52) U.S. Cl.
CPC ........... *B64D 7/00* (2013.01); *Y10T 403/1624* (2015.01)

(58) Field of Classification Search
CPC ............. Y10T 403/16; Y10T 403/1616; Y10T 403/1624; Y10T 403/1683; Y10S 403/08; F16B 5/0216; F16B 5/0225; F16B 5/0233; F16B 5/025; B64D 1/02; B64D 1/04; B64D 1/06; B64D 1/08; B64D 7/00; B64D 7/04; B64D 7/08; F42B 15/36; F42B 99/00; F41A 27/06

USPC .......................................................... 411/999
See application file for complete search history.

(56) References Cited

U.S. PATENT DOCUMENTS

| | | | | |
|---|---|---|---|---|
| 1,319,635 A | * | 10/1919 | Wiley, Jr. ................. | B64D 1/06 102/275.9 |
| 3,041,913 A | * | 7/1962 | Liska ..................... | F16B 5/0208 411/87 |
| 3,956,964 A | * | 5/1976 | McGuire ................. | B64D 1/04 89/1.55 |
| 4,223,591 A | * | 9/1980 | Croissant, Jr. ........... | B64D 7/08 89/37.19 |
| 4,348,936 A | * | 9/1982 | Fulchiron ............... | F42C 14/06 89/1.55 |
| 4,461,593 A | * | 7/1984 | Rodseth ............... | H05K 5/0204 403/14 |

(Continued)

*Primary Examiner* — Josh Skroupa
*Assistant Examiner* — Kevin J Baynes
(74) *Attorney, Agent, or Firm* — Patterson + Sheridan, LLP (57) ABSTRACT

The present disclosure provides an assembly including at least one adjustable coupling mechanism. In one aspect, the first coupling mechanism includes a first component having a central axis parallel to its outside surface. The first component further includes an inside surface defined by a bore formed in the first component along a central bore axis. The central bore axis is offset from the central axis. The first component can be coupled to the assembly, uncoupled, rotated about its central axis, and recoupled to change a distance between the first coupling mechanism and another part of the assembly. The first component further includes a plurality of holes formed circumferentially around the bore bottom and extending through the bore bottom and the bottom surface of the first component that can be used to removably couple the first component to the assembly.

21 Claims, 6 Drawing Sheets

(56) References Cited

U.S. PATENT DOCUMENTS

| | | | | |
|---|---|---|---|---|
| 4,687,165 A * | 8/1987 | Blackburn | ............... | B23Q 3/18 |
| | | | | 248/274.1 |
| 5,061,134 A * | 10/1991 | Oh | ......................... | F16B 35/02 |
| | | | | 411/361 |
| 5,280,690 A * | 1/1994 | Hu | ..................... | E04F 13/0855 |
| | | | | 52/511 |
| 5,314,144 A * | 5/1994 | Porter, Jr. | ............. | F16B 5/0208 |
| | | | | 244/119 |
| 5,996,463 A * | 12/1999 | Gyre | ..................... | F41A 27/06 |
| | | | | 89/37.16 |
| 6,227,096 B1 * | 5/2001 | Thomas | ................. | F42B 15/00 |
| | | | | 102/374 |
| 6,530,718 B2 * | 3/2003 | Nygren | ................. | B64G 1/645 |
| | | | | 403/337 |
| 7,685,918 B2 * | 3/2010 | Bar-on | .................... | B64D 1/04 |
| | | | | 294/82.26 |
| 7,966,921 B1 * | 6/2011 | Alday | .................... | F42C 17/04 |
| | | | | 244/54 |
| 8,495,945 B1 * | 7/2013 | Kirchner | ................ | F42B 15/01 |
| | | | | 89/1.805 |
| 8,708,303 B2 * | 4/2014 | Bigelow | ................ | A47G 1/162 |
| | | | | 248/498 |
| 8,882,424 B2 * | 11/2014 | Naruse | ............... | G03G 21/1685 |
| | | | | 411/352 |
| 9,127,701 B2 * | 9/2015 | Tung | .................... | F16B 5/0208 |
| 9,718,548 B2 * | 8/2017 | Doyle, Jr. | ............... | B64D 7/04 |
| 9,810,513 B2 * | 11/2017 | Kerns | ................... | F42B 12/204 |

* cited by examiner

ADJUSTABLE COUPLING MECHANISMS FOR PROJECTILE DEVICES

FIELD

Aspects of the present disclosure relate to various configurations of projectile devices.

BACKGROUND

Various types of projectile devices can include components of varying weights and geometries. Some projectile devices can include a payload and one or more guidance components. Projectile devices can be coupled to aircraft or other deployment systems. Depending upon the configuration of the projectile device, one or more coupling devices can be used to couple the projectile device to one or more of a guidance component, an aircraft, or to another deployment device.

SUMMARY

The present disclosure provides an assembly. In one aspect, the assembly includes: a first component comprising: a top surface, a bottom surface opposite the top surface, an overall height from the top surface to the bottom surface, an outside surface, and a central axis parallel to the outside surface. The first component further includes a bore formed in the first component along a central bore axis, the bore extending from the top surface towards the bottom surface. In one aspect, the bore is defined by a sidewall, a bore bottom, the central bore axis, and a bore height, the bore height being less than the overall height of the first component, and the central bore axis being offset from the central axis. The first component further includes a plurality of holes formed circumferentially around the bore bottom and extending through the bore bottom and the bottom surface of the first component.

In one aspect, in combination with any assembly above or below, the assembly further includes a first fastener removably coupled to a hole of the plurality of holes.

In one aspect, in combination with any assembly above or below, the assembly further includes a second fastener coupled to the bore bottom of the first component.

In one aspect, in combination with any assembly above or below, the assembly further includes a tethering mechanism, and the first fastener is tethered to the second fastener via the tethering mechanism.

In one aspect, in combination with any assembly above or below, the assembly further includes an assembly bore, and the first component is removably coupled to the assembly bore via the first fastener.

In one aspect, in combination with any assembly above or below, the assembly further includes the first component being formed from one or more materials selected from the group consisting of: steel, aluminum, titanium, nickel, nickel superalloy, and titanium superalloy.

In one aspect, in combination with any assembly above or below, the assembly further includes the sidewall of the bore having a minimum thickness and a maximum thickness, and a ratio of the minimum thickness to the maximum thickness is from 1:2 to about 1:7.

The present disclosure provides an assembly, in one aspect, the assembly including: a first component comprising: a first coupling mechanism comprising a first component and a second component. In one aspect, the first component comprises: a top surface, a bottom surface opposite the top surface, an overall height from the top surface to the bottom surface, an outside surface, and a central axis parallel to the outside surface. The first component further includes a bore formed in the first component along a central bore axis, the bore extending from the top surface towards the bottom surface, the bore being defined by a sidewall, a bore bottom, the central bore axis, and a bore height, the bore height being less than the overall height of the first component. The central bore axis is offset at a distance and/or an angle from the central axis, and a plurality of holes are formed circumferentially around the bore bottom and extend through the bore bottom and the bottom surface of the first component. In one aspect, the second component includes: a first portion, the first portion extending above the top surface of the first component when the second component is coupled to the first component, and a second portion of the second component is removably coupled to the first component via the bore of the first component.

In one aspect, in combination with any assembly above or below, the assembly further includes the second portion of the second component having a first plurality of threads.

In one aspect, in combination with any assembly above or below, the assembly further includes the first component being formed from one or more materials selected from the group consisting of: steel, aluminum, titanium, nickel, nickel superalloy, and titanium superalloy.

In one aspect, in combination with any assembly above or below, the assembly further includes the sidewall of the first component having a second plurality of threads configured to couple to the first plurality of threads of the second component.

In one aspect, in combination with any assembly above or below, the assembly further includes a first fastener removably coupled to a hole of the plurality of holes.

In one aspect, in combination with any assembly above or below, the assembly further includes a second fastener coupled to the bore bottom.

In one aspect, in combination with any assembly above or below, the assembly further includes a tethering mechanism, and the first fastener is tethered to the second fastener via the tethering mechanism.

In one aspect, in combination with any assembly above or below, the assembly further includes the first coupling mechanism and a second coupling mechanism, the first coupling mechanism being removably coupled to a first assembly bore via the first fastener and the second coupling mechanism being removably coupled to a second assembly bore.

In one aspect, in combination with any assembly above or below, the assembly further includes the first component being rotatable about the central axis when it is disposed in the first assembly bore.

The present disclosure provides a method of assembling coupling mechanisms, including: positioning a first component in a first assembly bore. The first component includes: a top surface, a bottom surface opposite the top surface, an overall height from the top surface to the bottom surface, an outside surface, and a central axis parallel to the outside surface. The first component further includes a bore formed in the first component along a central bore axis, the bore extending from the top surface towards the bottom surface, the bore being defined by a sidewall, a bore bottom, the central bore axis, and a bore height, the bore height being less than the overall height of the first component, and the central bore axis being offset from the central axis. The first component further includes a plurality of holes formed circumferentially around the bore bottom and extending through the bore bottom and the bottom surface of the first component. In one aspect, the method further includes: removably coupling a first fastener to a hole of the plurality of holes to removably couple the first component to the first assembly bore.

In one aspect, in combination with any assembly above or below, the method further includes tethering, via a tethering mechanism, the first fastener to a second fastener, the second fastener being coupled to the bore bottom.

In one aspect, in combination with any assembly above or below, the method further includes removably coupling a second component to the first component via the bore in the first component.

In one aspect, in combination with any assembly above or below, the method further includes removing the first fastener from the hole; rotating the first component in the first assembly bore about the central axis of the first component; and re-coupling the first fastener to a different hole of the plurality of holes.

The present disclosure provides an assembly, in one aspect, the assembly including: a first component comprising: an outside surface, a central axis parallel to the outside surface, and an inside surface defining an eccentric bore, the eccentric bore extending through a portion of the first component along a central bore axis, the eccentric bore being defined by a bore bottom, the central bore axis, and a bore height, the bore height being less than an overall height of the first component, wherein the central bore axis is offset from the central axis. The first component further includes a plurality of holes formed circumferentially around the bore bottom and extending through the bore bottom and a bottom surface of the first component, and a tool grip formed through the bottom surface of the first component.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure relates to one or more adjustable coupling mechanisms that can be used in projectile devices. In one example, the one or more adjustable coupling mechanisms can be used to couple two or more components of the projectile device. In another example, the one or more adjustable coupling mechanisms can be used to couple the projectile device to an aircraft or other deployment systems. Some projectile devices include a payload and a guidance component, the payload can be on the order of several hundred pounds (lbs.). In one example, the payload can be from about 200 lbs. to about 800 lbs. In one example, the guidance component can be a fraction of the weight of the payload. For example, the guidance component can be a tenth of the weight of the payload, e.g., from about 20 lbs. to about 80 lbs. In this example, two or more coupling mechanisms can be spaced a first distance apart in predetermined locations in order to balance the weight of the projectile device when it is coupled to an aircraft or other deployment systems. This first distance can be established via a company's internal standards, by government standards, by a non-governmental standards-setting agency, or by combinations of standards or specifications of varying origins.

However, when a weight of the guidance component is increased to be a greater weight as compared to the weight of the payload, the two or more coupling mechanisms can be positioned differently in the projectile device as compared to when a lighter guidance component is employed. This change in position can be made at least in part to account for change in geometry and/or weight distribution as the weight of the guidance system increases. In one example, if the payload is from about 200 lbs. to about 800 lbs., the guidance component can be from 20% to 100% of the weight of the payload. Accordingly, the standards and/or specifications associated with the distance between the two or more coupling mechanisms may recite a second, different distance, to account for the weight distribution of the projectile device. The second distance is different than the first distance and can be determined by a company's internal standards, by government standards, by a non-governmental standards-setting agency, or by combinations of standards or specifications of varying origins. The first and/or second distance can be associated with a fixed distance and a tolerance range. By using at least one of the adjustable coupling mechanisms discussed herein, the second distance between the at least two coupling mechanisms can be efficiently and reliably adjusted.

In one example, the projectile devices discussed herein can be assembled at an original equipment manufacturer (OEM). During this assembly, one or more coupling mechanisms can be removably coupled to the projectile device. As discussed herein, two or more components, parts, devices, or other aspects of an assembly or multiple assemblies are "removably coupled" to each other when the components, parts, devices, or other aspects of the present disclosure are secured to each other but can also be uncoupled and re-coupled in the same or different configurations. Subsequently, a first coupling mechanism can be rotationally adjusted by the OEM, by a vendor of the OEM, or by a customer of the OEM. This adjustment of the rotational position of one or more of the coupling mechanisms (e.g., the first coupling mechanism) can be performed for various purposes, including to bring a distance between the first coupling mechanism and a second coupling mechanism or other component of the assembly within a predetermined tolerance. In one example, the projectile device is received by the customer, and one or more of the coupling mechanisms can be adjusted such that the distance between the first and the second coupling mechanisms is within a tolerance established by the OEM or customer's internal specifications, by government standards, by a non-governmental standards-setting agency, or by combinations of standards or specifications of varying origins. Using the systems, devices, and methods discussed herein, at least one coupling mechanism can be adjusted such that the specified distance can be safely, repeatable, and efficiently brought within tolerance. In some examples, once this distance is established within tolerance, the projectile device can be coupled to an aircraft or another deployment system.

Projectile Device Including Coupling Mechanisms

Figure 1:
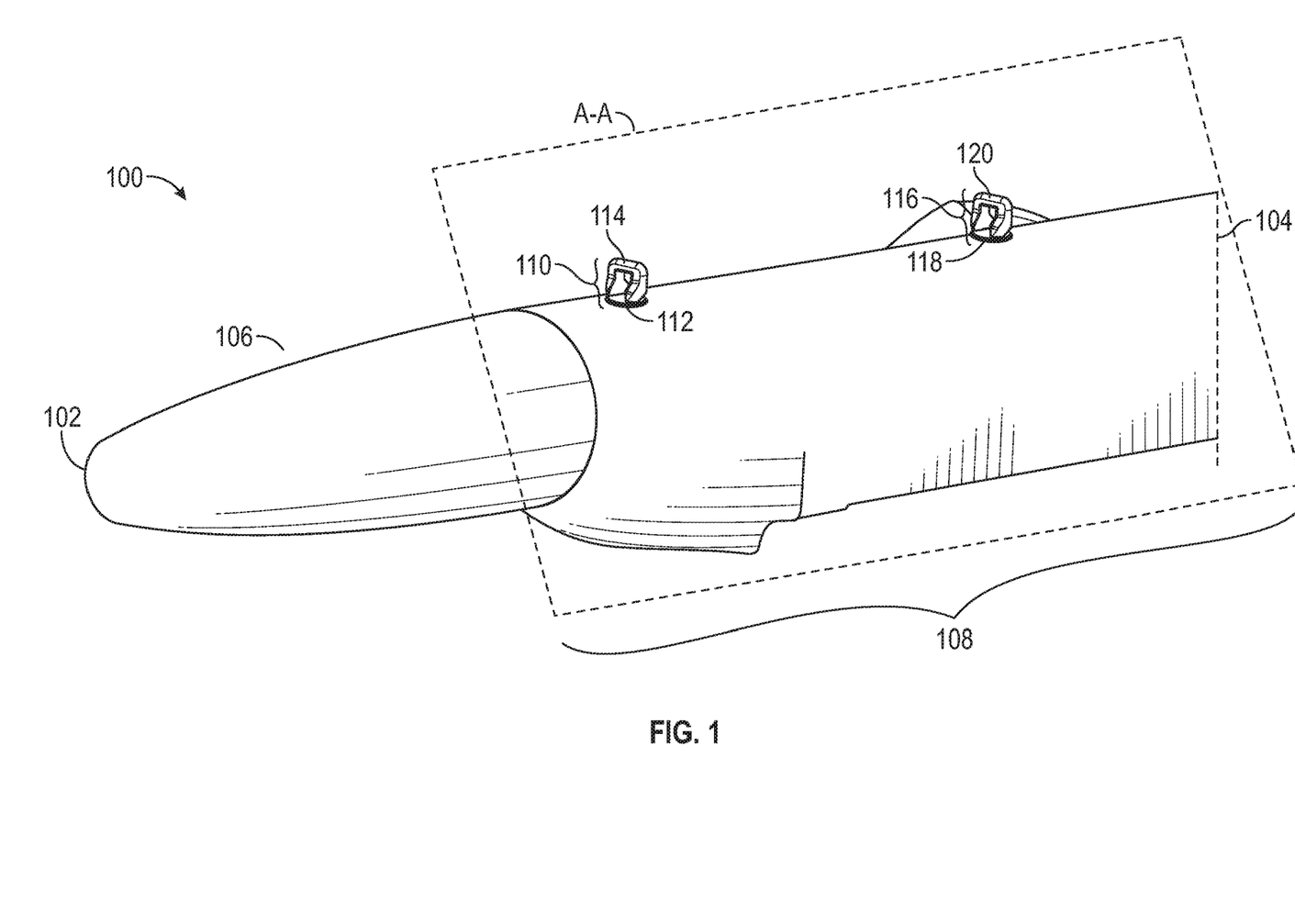
FIG. 1 depicts a partial illustration of a projectile device including coupling mechanisms according to various aspects of the present disclosure.

FIG. 1 depicts a partial illustration of a projectile device 100 according to various aspects of the present disclosure. The projectile device 100 can be defined by a first end 102 and a second end 104. The second end 104 is not shown in detail herein. The projectile device can include a payload 106 coupled to a guidance component 108. The guidance component 108 can include mechanical, electrical, electromechanical, and software components that can be used to received feedback about various aspects of the projectile device 100 and/or to guide the projectile device 100. The payload 106 can weigh on the order of several hundred pounds. In one example, the payload 106 can weigh from about 200 lbs. to about 800 lbs. In various examples, the guidance component 108 can have a weight that is from about 50% to about 100% of the weight of the payload 106. In other examples, the guidance component 108 can have a weight that is more than the weight of the payload 106.

The projectile device 100 can further include a first coupling mechanism 116 and a second coupling mechanism 110. The first coupling mechanism 116 includes a first component 118 and a second component 120. The first component 118 of the first coupling mechanism 116 is disposed in and coupled to the guidance component 108 via a first assembly bore, discussed below in FIG. 2. In one example, the first coupling mechanism 116 is removably coupled to the guidance component 108 via the first component 118. The first component 118 can be removably coupled to the guidance component 108 via mechanical, magnetic, or other means or combinations of means. The first component 118 of the first coupling mechanism 116 is rotationally adjustable about a central axis (not shown here) of the first component 118. A second component 120 of the first coupling mechanism 116 is partially disposed in and removably coupled to the first component 118. The second component 120 can be removably coupled to the first component 118 via mechanical, magnetic, or combinations of means. In one example, various mechanical means, including threads, can be used to couple the second component 120 to the first component 118. Each of the first component 112 and the second component 114 of the first coupling mechanism 116 can be formed from formed from steel, aluminum, titanium, nickel, nickel superalloy, titanium superalloy, or alloys or combinations thereof. In some examples, each of the first component 112 and the second component 114 of the first coupling mechanism 116 are formed from the same material or combinations of materials. In other examples, each of the first component 112 and the second component 114 of the first coupling mechanism 116 are formed from the different materials or combinations of materials.

The second coupling mechanism 110 is spaced a predetermined distance (shown below in FIG. 2) from the first coupling mechanism 116. This predetermined distance can be determined by various weights and geometries of components of the projectile device 100 and can be based on standards and/or specifications of varying origin. The second coupling mechanism 110 includes a first component 112 and a second component 114. The first component 112 of the second coupling mechanism 110 is disposed in and coupled to the payload 106. In one example, the second coupling mechanism 110 is removably coupled to the payload 106. A second component 114 of the second coupling mechanism 110 is partially disposed in and coupled to the first component 112.

The first coupling mechanism 116 can be configured such that it can be adjusted to change a distance between the first coupling mechanism 116 and the second coupling mechanism 110. This distance can be determined by the OEM or customer's internal specifications, by government standards, by a non-governmental standards-setting agency, or by combinations of standards or specifications of varying origins. In some examples, the second coupling mechanism 110 is not rotationally adjustable. In other examples, the second coupling mechanism 110 is rotationally adjustable along a central axis (not shown here) of the second coupling mechanism 110. In still other examples, both of the second coupling mechanism 110 and the first coupling mechanism 116 are rotationally adjustable about a central axis of each coupling mechanism. Each of the first component 118 and a second component 120 from the first coupling mechanism 116 can be formed from formed from steel, aluminum, titanium, nickel, nickel superalloy, titanium superalloy, or alloys or combinations thereof. Depending upon the examples, each of the first component 118 and the second component 120 can be formed from the same material or from different materials. FIG. 1 further shows a section A-A of the projectile device 100.

Figure 2:
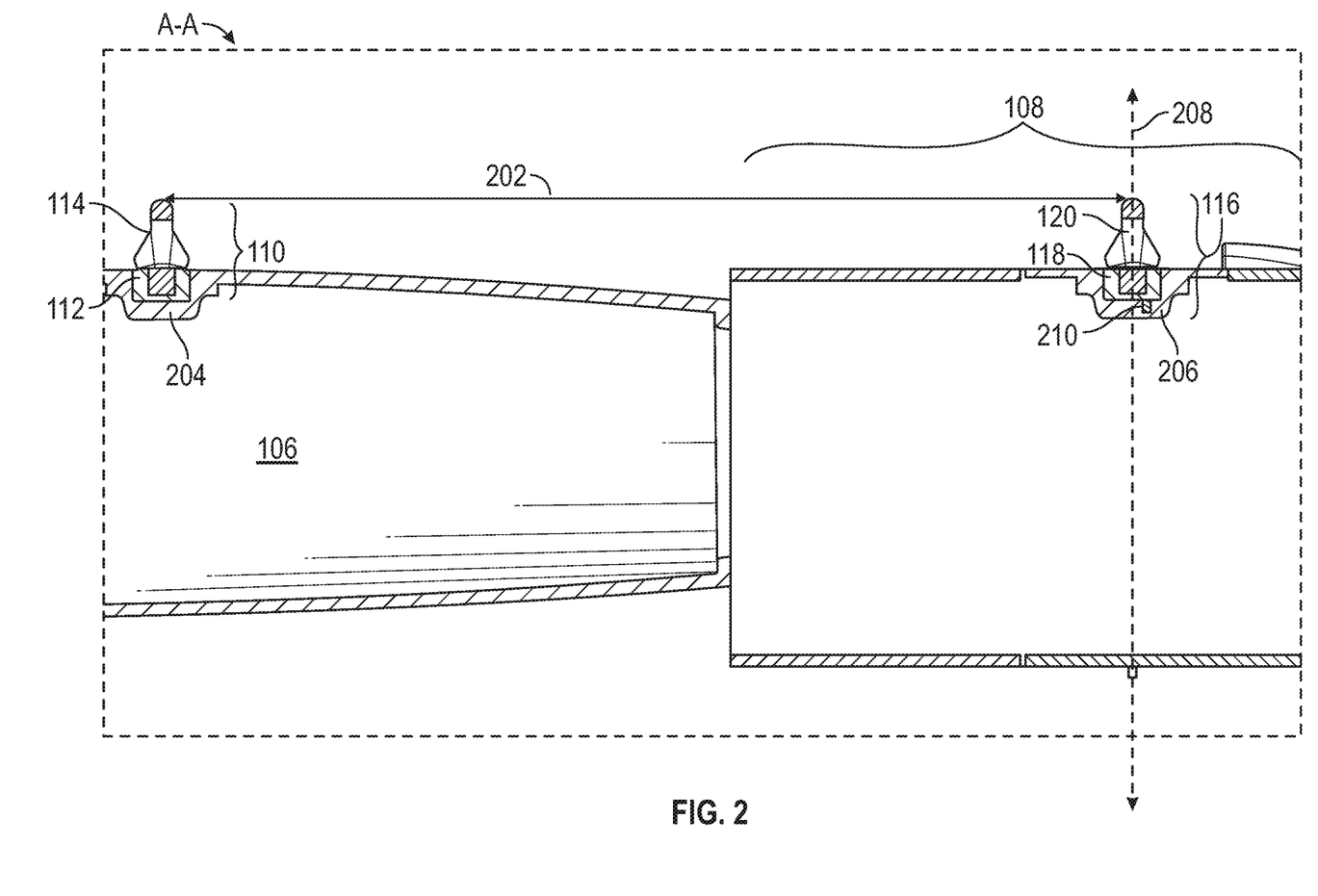
FIG. 2 depicts a cross-section of a projectile device including coupling mechanisms according to various aspects of the present disclosure.

FIG. 2 depicts section A-A of the projectile device 100 in FIG. 1. Section A-A in FIG. 2 is a cross-section of a portion of the projectile device 100 in FIG. 1. Section A-A shows a distance 202 between the second coupling mechanism 110 and the first coupling mechanism 116. In one example, the distance 202 can be from about 6 inches to about 48 inches. As discussed above, the distance 202, including any tolerances associated with the distance, can be determined by the OEM or customer's internal specifications, by government standards, by a non-governmental standards-setting agency, or by combinations of standards or specifications of varying origins. Depending upon the example, a tolerance can be on the order of inches (X.0"), tenths of inches (X.Y"), hundredths of inches (X.0Y"), or thousandths of inches (X.00Y"). In one example, the distance 202 can be measured using various points of each of the second component 114 of the second coupling mechanism 110 and the second component 120 of the first coupling mechanism 116. In one example, the distance 202 can be measured between a top center point of the second component 114 of the second coupling mechanism 110 and the second component 120 of the first coupling mechanism 116, as discussed below in FIG. 5A.

The first coupling mechanism 116 can be coupled to a first assembly bore 206 via one or more mechanical, magnetic, or combination means. In one example, the first coupling mechanism 116 can be coupled to the first assembly bore 206 using a first fastener 210. Additional or alternate coupling means for the first coupling mechanism 116 and the first assembly bore 206 can include threading, magnets, press-fit, or combinations of means. The second coupling mechanism 110 can be coupled to a second assembly bore 204. This coupling can occur via a plurality of mechanical means, magnetic means, or by combinations of various types of means. One or more components of the first coupling mechanism 116 can be rotated about a central axis 208 in order to vary the distance 202 between the second component 114 of the second coupling mechanism 110 and the second component 120 of the first coupling mechanism 116. This distance 202 can be varied, for example, in order to achieve a distance 202 that is within a predetermined distance specified as discussed herein.

Well Component

Figure 3A:
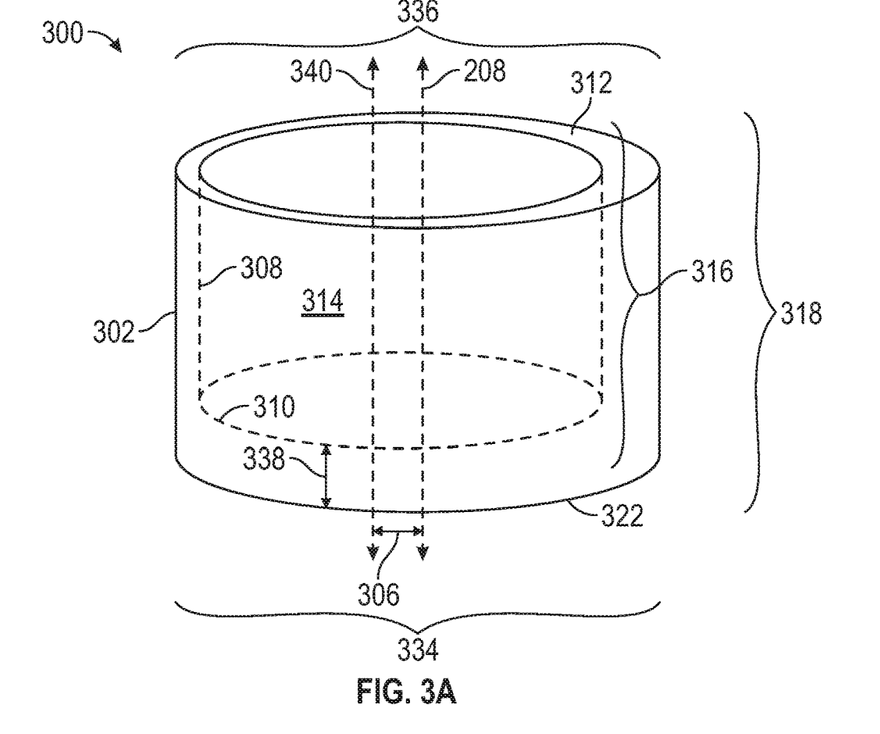
FIG. 3A depicts an illustration of a first component of a projectile device including coupling mechanisms according to various aspects of the present disclosure.

FIG. 3A depicts an illustration of a first component 300 of a coupling mechanism. The first component 300 may be similar to the first component 118 of the first coupling mechanism 116 in FIG. 1. In one example, the first component 300 can be referred to as a "well." In one example, the first component 300 includes a top surface 312 opposite a bottom surface 322. The central axis 208 defines the center point of the first component 300 about which the first component 300 can be rotated. An overall height 318 of the first component 300 extends from the top surface 312 to the bottom surface 322. The top surface 312 can have a top width 336. The bottom surface 322 can have a bottom width 334. In one example, the central axis 208 is parallel to an outside surface 302. In FIG. 3A, outside surface 302 is shown as being about perpendicular to the top surface 312 and the bottom surface 322, and the top width 336 is shown as being approximately the same as the bottom width 334. However, in another example of the first component 300, the outside surface 302 can be tapered such that the top width 336 is greater than the bottom width 334. In still another example of the first component 300, the outside surface 302 can be tapered such that the top width 336 is less than the bottom width 334.

The first component 300 further includes a sidewall 308 that is an inside surface which defines a bore 314 formed along a central bore axis 340. The bore 314 extends from the top surface 312 to a bore bottom 310 and has a bore height 316. The central bore axis 340 can be parallel to the central axis 208 and offset from the central axis by an offset distance 306. The offset defined by the offset distance 306, can be from about 1% of the maximum width of the first component 300 to about 33% or more of the maximum width of the first component. As discussed herein, the "maximum width" can be defined as either the top width 336 or the bottom width 334, depending upon which is greater in the example. Since the bore 314 is positioned in a location other than along the central axis 208, rotating the first component 300 about the central axis 208 re-positions the bore 314, as well as components coupled to or later coupled to the bore 314, relative to other components in an assembly. In one example, a position of the first component 300 is adjusted as compared to a position of another coupling mechanism. In another example, the central bore axis 340 offset from the central axis by the offset distance 306, and can additionally be angularly offset such that the central bore axis 340 is not parallel to the central axis 208. For example, the central bore axis 340 can be offset from the central axis 208 by about 0.01 degree to about 60 degrees or more in any direction as compared to the central axis 208. In another example, the central bore axis 340 can be offset from the central axis 208 by about 0.01 degree to about 30 degrees in any direction as compared to the central axis 208. In yet another example, the central bore axis 340 can be offset from the central axis 208 by about 0.01 degree to about 6 degrees in any direction as compared to the central axis 208. The bore bottom 310 is offset from the bottom surface 322 of the first component 300 by a distance of 338. The bore height 316 is less than the overall height 318 of the first component 300. The distance 338 can be from about 1% to about 33% of the overall height 318. The bore bottom 310 includes a plurality of features shown in FIG. 3B.

Figure 3B:
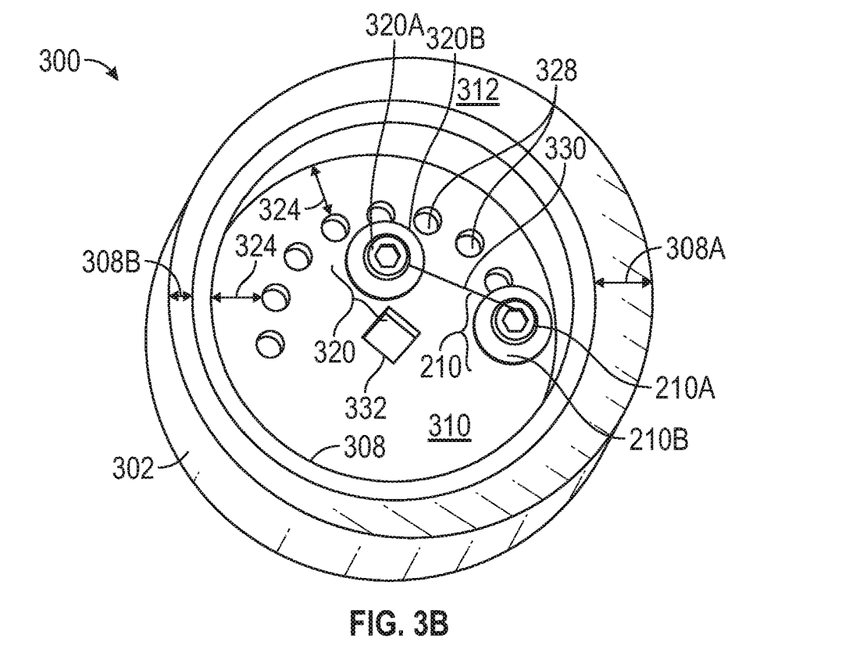
FIG. 3B depicts a top view of the first component in FIG. 3A of a coupling mechanism according to various aspects of the present disclosure.

FIG. 3B depicts a top view of the first component 300 in FIG. 3A. FIG. 3B shows the outside surface 302, the top surface 312, and the bore bottom 310. Since the bore 314 is offset from the central axis 208 of the first component 300 (as shown in FIG. 3A), the top surface 312 varies in thickness circumferentially, contributing to a variation in the thickness of the sidewall 308. This can be referred to as an "eccentric" configuration, since the bore 314 is not formed to share a common central axis with the central axis 208. Accordingly, the bore 314 can alternately be referred to as an "eccentric bore" 314. In an example in FIG. 3B, a maximum sidewall thickness 308A and a minimum sidewall thickness 308B are shown. In one example, a ratio of the minimum sidewall thickness 308B to the maximum sidewall thickness 308A (308B:308A) can be from about 1.0:1.1 to about 1:10. In other examples, the ratio of the minimum sidewall thickness 308B to the maximum sidewall thickness 308A (308B:308A) can be from about 1:2 to about 1:7.

Further, the first component 300 can be coupled to an assembly by one or more means. In one example, as shown in FIG. 3B, a plurality of holes 328 are circumferentially distributed along the bore bottom 310. In one example, the plurality of holes 328 are through-holes which extend through the bore bottom 310 and the bottom surface 322 of the first component 300. The plurality of holes 328 can be used to removably couple the first component 300 to an assembly bore. In other examples of the first component 300, the first component can be coupled to an assembly via one or more holes or other features formed in the sidewall 308 of the first component 300. In another example, a flange (not shown) extending outward from the top surface 312 can be used instead of or in conjunction with the plurality of holes 328 to position and/or removably couple the first component 300 to the assembly bore. The plurality of holes 328 can be referred to as "markers" or "positional markers" since the first component 300 can be rotated around the central axis 208 (shown in FIG. 3A) and the plurality of holes 328 can be used to determine an amount of rotation, and a position of the first component 300 in the assembly bore. The plurality of holes 328 can be further used to removably couple the first component 300 to an assembly bore, such as the first assembly bore 206 in FIG. 2.

The first component 300 can be removably coupled to the assembly bore (not shown here) using a first fastener 210. In one example, the first fastener 210 includes a first part 210A that is positioned through a first hole of the plurality of holes 328 and a second part 210B that removably couples the first part 210A in a first position in the first assembly bore 206. In another example, the first fastener 210 can be a single component that is press-fit, magnetically, mechanically, or otherwise configured to be coupled to a first hole of the plurality of holes 328.

In FIG. 3A, nine holes 328 are illustrated in a horseshoe-like fashion. In other examples, of the first component 300, there may be from about 1 to about 100 holes 328, or from about 4 to about 50 holes 428, or from about 5 to about 20 holes, or from about 8 to about 10 holes. In still other examples, the plurality of holes 328 can be arranged in a circular formation, in a polygon formation, randomly, or in other confirmations. Further in FIG. 3A, the plurality of holes 328 are shown as being substantially similar (e.g., within 5% of each other) in diameter. However, in other examples, one or more of the plurality of holes 328 may have a diameter than is smaller or larger than an adjacent or a non-adjacent other hole of the plurality of holes by more than about 5%.

In some examples, such as if a plurality of first components 300 are shipped as spare parts, the first fastener 210 can be removably coupled to one of the plurality of holes 328. Each hole of the plurality of holes 328 are shown in FIG. 3B as being spaced approximately equidistant from an adjacent hole. Furthermore as shown in FIG. 3A, each hole of the plurality of holes 328 is spaced approximately (e.g., within 5%) the same distance from each adjacent hole. In other examples, two or more holes of the plurality of holes 328 may be formed closer to or further away from an adjacent hole as compared to the spacing between other adjacent holes of the plurality of holes 328. Additionally in FIG. 3B, each of the plurality of holes 328 are shown as being a about distance 324 from the sidewall 308, which can also be described as an inside surface of the first component 300. However, in other examples, one or more of the plurality of holes 328 may be spaced at a different distance from the sidewall 308 that can be greater or less than the distance 324. Each of the plurality of holes 328 are shown as having substantially circular cross-sections in FIG. 3B. However, in other examples, one or more of the plurality of holes 328 may have another cross-sectional geometry, such as a triangle, square, rectangle, or other polygon. Further, while each hole of the plurality of holes 328 is shown as being separate from each adjacent hole, in other examples of the first component 300, two or more of the holes can be connected. In this example, the first component 300 could be rotated within the first assembly bore 206 without being uncoupled from the first assembly bore 206.

In one example, the first fastener 210 is configured to removably couple the first component 300 to an assembly bore, such as the first assembly bore 206 in FIG. 2. In other examples, additional coupling mechanisms such as threading or magnetic means used to removably couple the first component 300 in the first assembly bore 206 may be included in the first component 300. These additional coupling mechanisms can be formed in locations such as on or in the outside surface 302. The first fastener 210 can be removably coupled to a second fastener 320 via a tethering mechanism 330. The second fastener 320 includes a first part 320A and a second part 320B that can be assembled through a different hole than the plurality of holes 328. In various aspects of the assembly, the second fastener 320 can be permanently or removably coupled to the first component 300. In another example, the first component 300 can be fabricated such that the second fastener 320 is formed as a feature of, and thus is integral to, the first component 300. The second fastener 320 is used to removably couple the first fastener 210 to the first component 300 during rotational adjustment of the first component, since the first fastener 210 is removed in whole or in part from one of the plurality of holes 328 during its adjustment.

The tethering mechanism 330 can be a wire, a combination of wires, or otherwise configured to be capable of removably coupling the first fastener 210 to the second fastener 320. The tethering mechanism 330 can be formed from various metals or alloys such as steel, titanium, nickel, aluminum, or combinations or alloys thereof. The tethering mechanism 330 can further be used to couple the first fastener 210 to the first component 300 when the first fastener is not coupled to a hole of the plurality of holes 328. For example, when the first fastener 210 is removed from a hole of the plurality of holes 328 to adjust the first component 300 (discussed below in the method in FIG. 6), the tethering mechanism 330 couples the first fastener 210 to the second fastener 320 so that the first fastener 210 does not becomes loose, and possibly lost, in the larger assembly. Accordingly, the first part 210A and the second part 210B of the first fastener 210 may be coupled such that the second part 210B can be adjusted to removably couple the first fastener 210 in a hole of the plurality of holes 328. The first part 210A and the second part 210B of the first fastener 210 can be further configured so that the first part 210A and second part 210B do not detach during the removal and re-attachment of the first fastener 210 to the first component 300.

Further included in the first component 300 is a tool grip 332. The tool grip 332 is a through-hole that extends through the bore bottom 310 through the bottom surface (322 in FIG. 3A) of the first component 300. While the tool grip 332 is shown as having a substantially square shape in FIG. 3B, it may take other forms in different examples. The tool grip 332 can be for one or more of placing, rotating, or removing the first component 300 with respect to an assembly bore.

Lug Component

Figure 4:
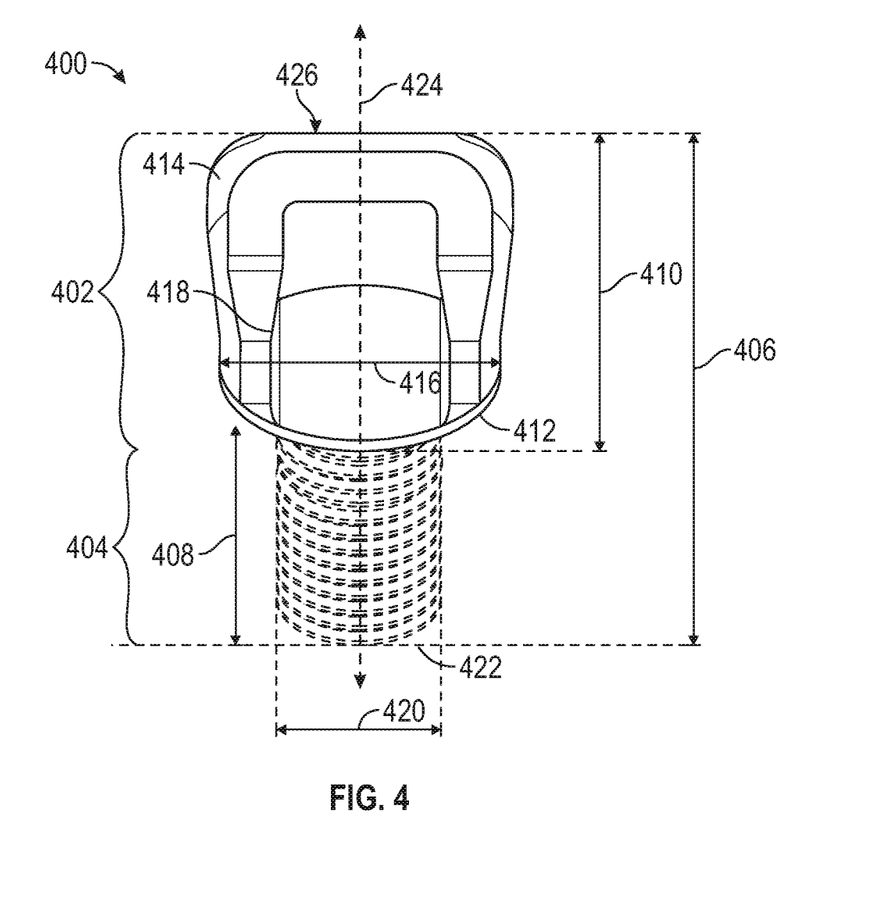
FIG. 4 depicts an illustration of a second component of a coupling mechanism according to various aspects of the present disclosure.

FIG. 4 depicts an illustration of a second component 400 of a coupling mechanism according to aspects of the present disclosure. The second component 400 may be similar to the second component 120 of the first coupling mechanism 116 in FIG. 1. The second component 400 can be referred to as a "lug." The second component 400 is configured to be partially disposed in the first component 300. In one example, the second component 400 weighs more than the first component 300. In another example, the second component 400 weighs less than the first component 300. In yet another example, the weight of the second component 400 is substantially similar (e.g., within 5% of) the weight of the first component 300. The second component 400 has a first portion 402 defined by a top surface 414 and a bottom surface 412 of the first portion 402. A central axis 424 of the second component 400 bisects the top surface 414 at a center point 426 of the top surface, defining a center of the second component 400. The second component 400 further includes a second portion 404 adjacent and connected to the first portion 402. The first portion 402 includes a feature 418 that can have various geometries, and that may be recessed, protruding, or otherwise formed in or through the first portion 402 of the second component 400. In one example, the feature 418 can be used to tighten the second component 400 when it is coupled to the first component (300). In another example, the feature 418 can be used to couple a projectile device (such as the projectile device 100 in FIG. 1) to an aircraft or another deployment system. The feature 418 can be configured to couple to a tool (not shown here) that can be used to adjust the second component 400. In some examples, the feature 418 can be a through-hole configured to enable the adjustment of the second component and/or the coupling of the component 400 to a projectile device. In other examples, the feature 418 can be otherwise configured as an indentation configured to enable the adjustment of the second component and/or the coupling of the component 400 to a projectile device. In still other examples, the feature 418 can be coupled to a spring-loaded mechanism in the second portion 404. The feature 418 can take various shapes, including circular, elliptical, polygonal, triangular, or combinations thereof.

The second component 400 has an overall height 406 extending from the top surface 414 to a bottom surface 422 of the second component 400. The first portion 402 has a first portion height 410 and a first portion width 416. The second portion 404 has a second portion height 408 and a second portion width 420. In some examples, the first portion height 410 can be greater than the second portion height 408. In other examples, the first portion height 410 can be less than the second portion height 408. In still other examples, the first portion height 410 can be substantially the same as the second portion height 408. In some examples, the first portion width 416 can be greater than the second portion width 420. In other examples, the first portion width 416 can be less than the second portion width 420. In still other examples, the first portion width 416 can be substantially the same as the second portion width 420. The second portion 404 can include coupling mechanisms (not shown) configured to removably couple the second component 400 to the first component (300 in FIG. 3B). These coupling mechanisms can include threads, magnets, or other mechanical or combination coupling mechanisms.

Coupling Mechanism

Figure 5A:
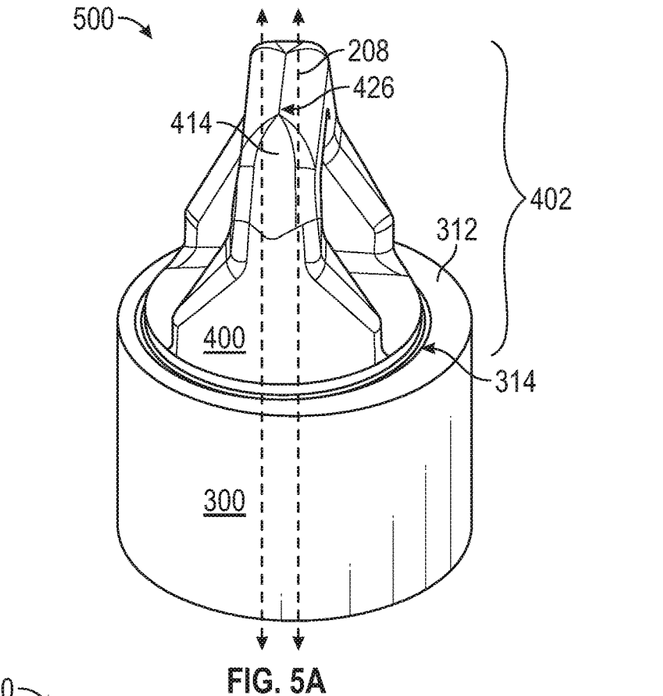
FIGS. 5A and 5B depict views of coupling mechanisms according to various aspects of the present disclosure.
Figure 5B:
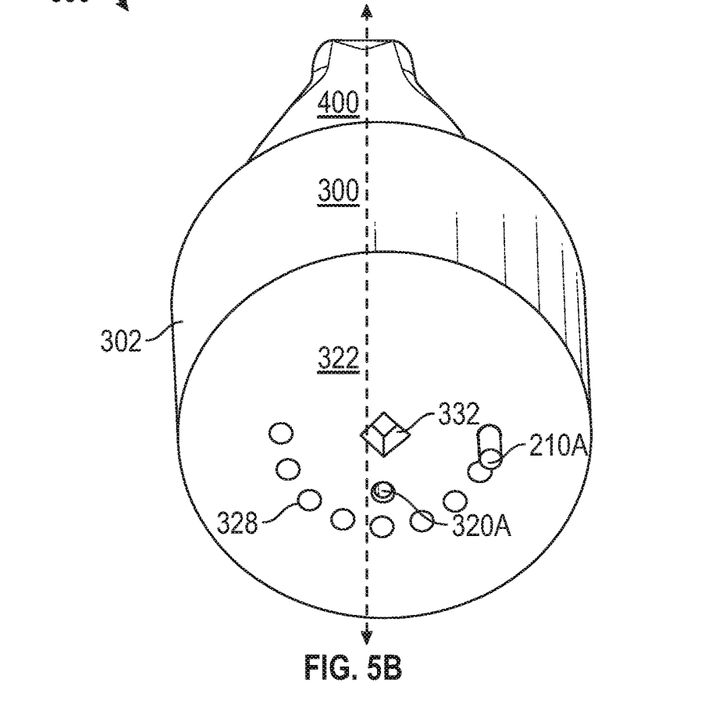

FIGS. 5A and 5B depict views of a coupling mechanism 500 according to embodiments of the present disclosure. The coupling mechanism 500 can be similar to the first coupling mechanism 116 in FIGS. 1 and 2. The coupling mechanism 500 is shown uncoupled from an assembly bore as compared to the first coupling mechanism 116 as shown in FIGS. 1 and 2. The coupling mechanism 500 can be in the configurations shown in FIGS. 5A and 5B when it is shipped as a spare, and/or if it is removed from the assembly bore for various reasons to be later assembled or re-assembled to the assembly bore.

FIG. 5A shows the second component 400 being removably coupled to the first component 300 via the bore 314 of the first component 300. Further in FIG. 5A, the first portion 402 of the second component 400 extends above the top surface 312 of the first component 300. This enables the first portion 402 to be coupled to a second assembly such as an aircraft or other projectile delivery device. FIG. 5A also shows the central axis 208 being offset from the central bore axis 340, as previously shown in FIG. 3A. As discussed below in FIG. 6, the first component 300 can be uncoupled from the second component 400. The first component 300 can be rotated about the central axis 208. The coupling mechanism 500 can be subsequently reassembled and recoupled to an assembly bore (such as 206 in FIG. 2). Because of the offset between the central bore axis 340 and the central axis 208, a distance between the coupling mechanism 500 and another component of the projectile device, such as a different coupling mechanism, is changed via the rotation of the first component 300 of the coupling mechanism 500. In another example, the change in distance can be measured using a position of the center point 426 of the top surface 414 of the second component 400. This can be referred to as a "dual rotation," since the rotation of the first component 300 about its central axis 208 also rotates a position of the second component 400, regardless of whether the second component 400 is coupled to the first component 300 during the rotation, or if it is recoupled to the first component 300 subsequent to rotation of the first component 300. In some examples, the center point 426 may be located along the central bore axis 340, such that the central axis 424 of the second component 400 (show in FIG. 4) is the same as the central bore axis 340. In other examples, the center point 426 can be offset from the central bore axis 340, such that the central axis 424 of the second component 400 is offset from the central bore axis.

FIG. 5B depicts a bottom view of the coupling mechanism 500 in FIG. 5A. The first part 210A of the first fastener 210 is also shown as it extends through one of the plurality of holes 328. The bottom surface 322 of the first component 300 is shown with the first part 320A of the second fastener 320 being permanently or removably coupled to the bore bottom (310, opposite the bottom surface 322 and not shown here). In FIG. 5B, the first part 320A of the second fastener 320 is shown as not extending through the bottom surface 322 of the first component. In other examples, a portion of the first part 320A of the second fastener 320 can extend through the bottom surface 322.

Method of Use

Figure 6:
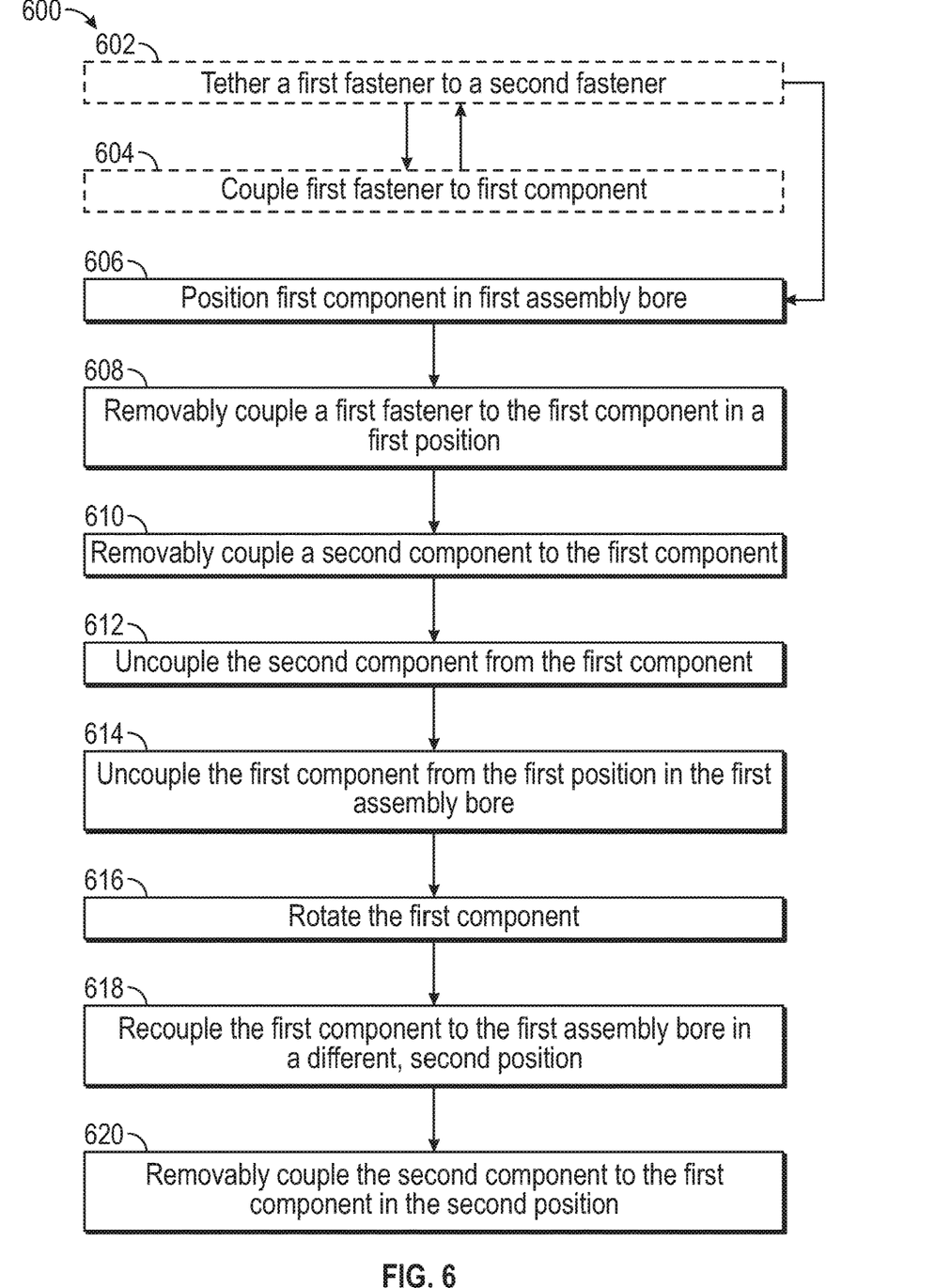
FIG. 6 depicts a flow chart of a method of using coupling mechanisms configured according to various aspects of the present disclosure.

FIG. 6 depicts a flow chart of a method 600 of using coupling mechanisms according to examples of the present disclosure. In one example, at operation 602, a first fastener is tethered to a second fastener, the second fastener being permanently or removably coupled to the first component such as 300 in FIGS. 3A and 3B above. Operation 602 can be performed in various ways, for example, the second fastener can be coupled to the first component and the first fastener can subsequently be tethered to the second fastener via the tethering mechanism. In another example, operation 602 can be performed by tethering the first fastener to the second fastener, and subsequently coupling the second fastener to the first component.

In some examples, subsequent to operation 602, the method proceeds to operation 604. At operation 604, the first fastener can be coupled to the first component. In other examples, operation 604 may precede operation 602. When the first fastener is coupled to the first component and tethered to the second fastener via the tethering mechanism, the first component can be subsequently assembled to a projectile device as discussed in operations 608-620.

In another example, operation 602 can be followed by operation 606. At operation 606, the first component can be positioned in a first assembly bore in a first position. At operation 608, the first fastener can be coupled to the first component to removably couple the first component to the assembly bore in the first position. In an example where operation 604 precedes operation 608, the fastener can be uncoupled from the first component prior to removably coupling the first component to the assembly bore in the first position. At operation 610, a second component such as the second component 400 in FIG. 4 can be removably coupled to the first component. When the second component is removably coupled to the first component, as shown in FIGS. 5A and 5B, the assembly can be referred to as a "coupling mechanism," as noted above. The removable coupling at operation 610 can occur via, for example, the use of threads or other mechanical means. At operation 612, the second component is uncoupled from the first component. In some examples, various operations (not shown here) can occur in between operations 610 and 612, for example, transporting the assembly from a first location to a second location, or storing the assembly for later use.

At operation 614, the first fastener can be partially or completely removed from the hole in the first component to uncouple the first component from its first position in the assembly bore. The first fastener is removed from the hole in the first component sufficiently as to allow rotation of the first component about its central axis. In some examples, threading in the assembly bore and on the outside surface of the first component can additionally be used to removably couple the first component to the assembly bore. Subsequently, at operation 616, the first component is rotated about its central axis. The rotation at operation 616 can occur while the first component is completely or partially disposed in the assembly bore. In some examples of operation 616, the rotation can occur at least in part while the first component is removed from the assembly bore.

Subsequent to rotation at operation 616, at operation 618, the first component is re-coupled to the assembly bore via the first fastener in a second position. While in the second position, the first component is coupled to the assembly bore while the first fastener is coupled to a different hole as compared to when the first component was assembled in its first position. At operation 620, the second component can be re-coupled to the first component while the first component is removably coupled to the assembly bore in its second position. Operations 610-620 can be repeated if additional adjustments are desired. The second position, and/or subsequent positions, of the first component can be determined based on a range of distances to be established between the first coupling mechanism and one or more additional coupling mechanisms. Accordingly, the first component can be rotated in one or more iterations of operations 610-620, or operations 616-620, in order to establish a target distance between two or more coupling mechanisms. The operations discussed in the method 600 are discussed above as being in various orders. In other examples, the operations of method 600 may be performed in other orders or combinations of orders in order to assemble coupling mechanisms to projectile devices and/or for shipment as spare parts.

Accordingly, using the coupling mechanisms discussed herein, a distance between two or more coupling mechanisms can be adjusted by rotating one of the coupling mechanisms to establish a target distance. Because of the offset between the central bore axis and the central axis of the coupling mechanism, this rotation about the central axis can move the position of the center point of the second component of the coupling mechanism to bring the distance between the two coupling mechanisms within a predetermined measurement tolerance. This distance can be measured using various means including go/no-go gages. The projectile device can thus be coupled to an aircraft or another deployment system via the coupling mechanisms.

In the current disclosure, reference is made to various aspects. However, it should be understood that the present disclosure is not limited to specific described aspects. Instead, any combination of the above features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon. The computer readable storage medium can be a part of the guidance component or part of other systems associated with the projectile device not shown here.

Program code embodied on a computer readable storage medium may be transmitted using any appropriate medium, including but not limited to wireless, wireline, optical fiber cable, RF, etc., or any suitable combination of the foregoing. In one aspect of the present disclosure, program code can be transmitted to the guidance component to direct the projectile device within a predetermined range of a target.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. An assembly comprising:
 a first component comprising:
  a top surface,
  a bottom surface opposite the top surface,
  an overall height from the top surface to the bottom surface,
  an outside surface,
  a central axis parallel to the outside surface,
  a bore formed in the first component along a central bore axis, the bore extending from the top surface towards the bottom surface, the bore being defined by a sidewall, a bore bottom, the central bore axis, and a bore height, the bore height being less than the overall height of the first component, and the central bore axis being offset from the central axis, and
  a plurality of holes formed circumferentially around the bore bottom and extending through the bore bottom and the bottom surface of the first component.

2. The assembly of claim 1, further comprising: a first fastener removably coupled to a hole of the plurality of holes.

3. The assembly of claim 2, further comprising: a second fastener coupled to the bore bottom of the first component.

4. The assembly of claim 3, further comprising: a tethering mechanism, wherein the first fastener is tethered to the second fastener via the tethering mechanism.

5. The assembly of claim 2, further comprising: an assembly bore, wherein the first component is removably coupled to the assembly bore via the first fastener.

6. The assembly of claim 1, wherein the first component is formed from one or more materials selected from the group consisting of: steel, aluminum, titanium, nickel, nickel superalloy, and titanium superalloy.

7. The assembly of claim 1, wherein the sidewall of the bore has a minimum sidewall thickness and a maximum sidewall thickness, wherein a ratio of the minimum thickness to the maximum thickness is from 1:2 to about 1:7.

8. An assembly comprising:
 a first coupling mechanism comprising a first component and a second component, wherein the first component comprises:
  a top surface,
  a bottom surface opposite the top surface,
  an overall height from the top surface to the bottom surface,
  an outside surface,
  a central axis parallel to the outside surface,
  a bore formed in the first component along a central bore axis, the bore extending from the top surface towards the bottom surface, the bore being defined by a sidewall, a bore bottom, the central bore axis, and a bore height, the bore height being less than the overall height of the first component, and the central bore axis being offset from the central axis,
  a plurality of holes formed circumferentially around the bore bottom and extending through the bore bottom and the bottom surface of the first component,
 wherein the second component comprises:
  a first portion, the first portion extending above the top surface of the first component when the second component is coupled to the first component; and
  a second portion, the second portion being removably coupled to the first component via the bore of the first component.

9. The assembly of claim 8, wherein the second portion of the second component includes a first plurality of threads.

10. The assembly of claim 9, wherein the first component is formed from one or more materials selected from the group consisting of: steel, aluminum, titanium, nickel, nickel superalloy, and titanium superalloy.

11. The assembly of claim 10, wherein the sidewall of the first component includes a second plurality of threads configured to couple to the first plurality of threads of the second component.

12. The assembly of claim 11, further comprising: a first fastener removably coupled to a hole of the plurality of holes.

13. The assembly of claim 12, further comprising: a second fastener coupled to the bore bottom.

14. The assembly of claim 13, further comprising: a tethering mechanism, wherein the first fastener is tethered to the second fastener via the tethering mechanism.

15. The assembly of claim 12, wherein the assembly includes the first coupling mechanism and a second coupling mechanism, the first coupling mechanism being removably coupled to a first assembly bore via the first fastener and the second coupling mechanism being removably coupled to a second assembly bore.

16. The assembly of claim 15, wherein the first component is rotatable about the central axis when it is disposed in the first assembly bore.

17. A method of assembling coupling mechanisms, comprising:
 positioning a first component in a first assembly bore;
  a top surface,
  a bottom surface opposite the top surface,
  an overall height from the top surface to the bottom surface,
  an outside surface,
  a central axis parallel to the outside surface,
  a bore formed in the first component along a central bore axis, the bore extending from the top surface towards the bottom surface, the bore being defined by a sidewall, a bore bottom, the central bore axis, and a bore height, the bore height being less than the overall height of the first component, and the central bore axis being offset from the central axis,
  a plurality of holes formed circumferentially around the bore bottom and extending through the bore bottom and the bottom surface of the first component; and
 removably coupling a first fastener to a hole of the plurality of holes to removably couple the first component to the first assembly bore.

18. The method of claim 17, further comprising tethering, via a tethering mechanism, the first fastener to a second fastener, the second fastener being coupled to the bore bottom.

19. The method of claim 17, further comprising: removably coupling a second component to the first component via the bore in the first component.

20. The method of claim 17, further comprising:
removing the first fastener from the hole;
rotating the first component in the first assembly bore about the central axis of the first component; and
re-coupling the first fastener to a different hole of the plurality of holes.

21. An assembly comprising:
a first component comprising:
an outside surface,
a central axis parallel to the outside surface,
an inside surface defining an eccentric bore, the eccentric bore extending through a portion of the first component along a central bore axis, the eccentric bore being defined by a bore bottom, the central bore axis, and a bore height, the bore height being less than an overall height of the first component, wherein the central bore axis is offset from the central axis,
a plurality of holes formed circumferentially around the bore bottom and extending through the bore bottom and a bottom surface of the first component, and
a tool grip formed through the bottom surface of the first component.

* * * * *